United States Patent

Maruyama

[11] Patent Number: 5,960,030
[45] Date of Patent: *Sep. 28, 1999

[54] CARRIER DETECTION UNIT AND CARRIER DETECTION METHOD

[75] Inventor: Hidenori Maruyama, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/791,585

[22] Filed: Jan. 31, 1997

[30] Foreign Application Priority Data

Feb. 1, 1996 [JP] Japan .................................... 8-016585

[51] Int. Cl.[6] ............................ H04B 15/00; H04K 1/00; H04L 27/30
[52] U.S. Cl. ........................................... 375/200; 375/326
[58] Field of Search ..................................... 375/200, 206, 375/207, 208, 209, 324, 326, 340, 344, 375, 325, 316, 342; 455/182.1, 192.2, 229

[56] References Cited

U.S. PATENT DOCUMENTS

| | | |
|---|---|---|
| 4,554,508 | 11/1985 | Haque . |
| 5,131,006 | 7/1992 | Kamerman et al. ..................... 375/200 |
| 5,563,914 | 10/1996 | Sogabe .................................... 375/326 |
| 5,583,884 | 12/1996 | Maruyama et al. ..................... 375/207 |
| 5,625,639 | 4/1997 | Tomita et al. ........................... 375/200 |
| 5,638,406 | 6/1997 | Sogabe .................................... 375/326 |

FOREIGN PATENT DOCUMENTS 8-204614   8/1996   Japan .

Primary Examiner—Chi H. Pham
Assistant Examiner—Jean B Corrielus
Attorney, Agent, or Firm—Ostrolenk, Faber, Gerb & Soffen, LLP

[57] ABSTRACT

A correlator 1 and an amplitude detection section 2 detect a correlation value of a spectrum spread signal. A maximum value detection section 5 detects a maximum correlation value for each symbol, which is then sequentially added by an adder section 6. A carrier detection section 4 compares the added value with a threshold value so as to detect presence/absence of carrier.

9 Claims, 2 Drawing Sheets

CARRIER DETECTION UNIT AND CARRIER DETECTION METHOD

BACKGROUND OF THE INVENTION

The present invention relates to a carrier detection unit used in a radio data communication system of a spread spectrum system using a plurality of spread codes and a carrier detection method. More particularly, the present invention relates to the carrier detection unit and carrier detection method allowing for carrier detection both at preamble mode and data mode.

Packet transmission or the like has been conventionally employing a radio data communication system of a spread spectrum system using a plurality of spread codes (JP-A 12267/1995).

A reception side of a communication unit in the aforementioned radio data communication system is provided with a carrier detection unit for detecting a carrier of the received wave. The carrier is detected only at preamble mode for synchronization. Conventionally the carrier detection is not executed at data mode.

The radio data communication system of spread spectrum system using a plurality of spread codes is described at preamble mode and data mode, respectively.

[Preamble mode]

At a transmission side, 1 bit serial data for synchronization are information modulated through QPSK or the like. Each bit of the above information modulated serial data is a signal in which 1 symbol contains a predetermined number of chips. After the information modulation, a predetermined one kind of spread code is multiplied by each symbol with respect to each chip for spread modulation. The spread modulated signal is transmitted by a transmitter as a spectrum spread signal.

At a reception side, the transmitted spectrum spread signal is received, A/D converted and held by each symbol. The spread signal identical to that used in the transmission side is multiplied by each symbol per chip for de-spreading.

Detecting the carrier during reception causes auto correlation at a constant level by each symbol resulted from de-spreading. Therefore the presence/absence of the carrier can be detected by detecting the auto correlation. In order to establish synchronization, stable carrier detection is inevitable. Then an absolute value (hereinafter referred to as a correlation value) of an amplitude of the auto correlation obtained from each symbol is integrated. When the integrated value reaches a predetermined threshold value or more within a predetermined synchronization integration period, it is judged as presence of carrier, i.e., synchronization has been established. When the integrated value is less than the threshold value, it is judged as absence of carrier, i.e., synchronization has not been established yet. As for the absence of carrier, the correlation value stored in the synchronous integration section is cleared and set to "0" for re-establishing synchronization by executing synchronization integration again. Both the synchronization integration period and the threshold value can be set to any values depending on a balance between carrier detection time and the circuit size. An initial value "0" is preset in the synchronous integration section.

[Data mode]

Upon synchronization established at preamble mode, the communication mode is switched to data mode where information signals are transmitted/received.

At the transmission side, the information signal containing 1 bit serial data is converted into n bit parallel data. An m bit string of the n bit parallel data is modulated through QPSK or the like. At this time, a spread code having a predetermined code length corresponding to each of the bit pattern of the (n−m) bit string that has not been information modulated is generated. The spread code has maximum of $2^{(n-m)}$ variations for corresponding to each bit pattern of the (n−m) bit string one by one.

The generated spread code is multiplied by each bit (symbol) of the corresponding m bit string that has been information modulated by each chip for spread modulation. The spread modulated m bit string is transmitted as a spectrum spread signal from a transmitter.

At a reception side, the transmitted spectrum spread signal is received and A/D converted for holding in the input order by each symbol. The held signal is parallel transferred and latched at a synchronization point. The signal is then inverse spread with the spread code identical to that used for spreading.

At data mode, a spread code selected from $2^{(n-m)}$ variations is used depending on the bit pattern of the (n−m) bit string during transmission. Therefore at the reception side, it is required to specify as to which spread code has been used during transmission. In spectrum spread modulation, the correlation value becomes maximum through de-spreading with the spread code identical to that used for spreading. So the spread code generating the maximum correlation value is obtained. More specifically, all spread codes of $2^{(n-m)}$ variations are inverse spread by each symbol. Then the spread code generating the maximum correlation value of obtained correlation values is selected.

Based on the spread code generating the maximum correlation value, the spread code used for spreading during transmission is, thus defined. The bit pattern of (n−m) bit string corresponding to the above obtained spread code can be specified. The maximum correlation value is demodulated so as to obtain an m bit string. Using the (n−m) bit string and m bit string, the n bit parallel data that have been transmitted are reproduced.

In the conventional carrier detection unit, the carrier detection is executed only at preamble mode and not executed at data mode. However it is possible for the conventional carrier detection unit to execute carrier detection at data mode.

The carrier detection at preamble mode and data mode in the conventional carrier detection unit is described below referring to the drawings.

FIG. 4 is a block diagram showing a conventional carrier detection unit provided at the reception side.

FIG. 2 is a wave chart showing the reception level at preamble mode. In FIG. 4, a reference numeral 1 is a correlator for detecting auto correlation of a spectrum spread signal; 2 is an amplitude detection section for detecting an absolute value of the amplitude output from the correlator 1; 3 is a synchronous integration section for integrating the absolute value output from the amplitude detection section 2 with respect to each symbol; and 4 is a carrier detection section that judges as "presence of carrier" when the integrated value output from the synchronous integration section 3 is a predetermined threshold value of more and as "absence of carrier" when the integrated value is less than the predetermined value. In FIG. 2, 21 is a wave showing the amplitude of the auto correlation output from the correlator 1; 22 is a wave showing the absolute value of the wave 21 output from the amplitude detection section 2; and 23 is a wave showing the integrated value of the wave 22 output from the synchronous integration section 3.

The operation of the above constructed conventional art is described with respect to the preamble mode and the data mode.

[Preamble mode]

A received spectrum spread signal is A/D converted and supplied to the correlator 1. The correlator 1 inverse spreads the signal using the spread code that has been used during transmission so that an auto correlation amplitude is obtained (wave 21). The obtained amplitude is supplied to the amplitude detection section 2 where the absolute value of the amplitude is obtained (wave 22). The absolute value is supplied to the synchronous integration section 3 for synchronization integration (integration of the input signals). Then the obtained value is integrated by each unit of a symbol in a shift resistor (not shown) provided with the synchronous integration section 3 (wave 23). The obtained integrated value is always compared with a predetermined threshold value in the carrier detection section. When the integrated value exceeds the threshold value within a predetermined synchronization integration period, it is judged as "presence of carrier". When the integrated value does not exceed the threshold value, it is judged as "absence of carrier". As for the absence of carrier, the integrated value of the shift resistor is cleared and reset to 0. The integration is executed again and the aforementioned procedure is repeatedly executed until the synchronization is established.

[Data mode]

FIG. 5 is a wave chart showing the reception level during carrier detection at data mode. In FIG. 5, 51 is a wave showing the auto correlation amplitude output from the correlator 1; 52 is a wave showing the absolute value output from the amplitude detection section 2; and 53 is a wave showing the integrated value of the wave 52 output from the synchronous integration section 3.

At data mode, the timing for auto correlation by each symbol may be shifted by a unit of a chip because the spread code is changed depending on the pattern of the (n–m) bit string (See waves 51 and 52). As the integration is executed leaving the timing shifted, the integrated value hardly increases (See wave 53). As a result, the integrated value cannot reach the threshold value within the synchronization integration period. Then it is misjudged as "absence of carrier" in spite of presence of carrier, thus terminating reception forcibly. In order to prevent the aforementioned misjudgment, the synchronization integration period has to be set to a relatively long time so that the integrated value reaches the threshold value. Otherwise the threshold value has to be set to a smaller value.

As aforementioned, in the conventional art, the synchronization integration period has to be set to a longer time at data mode for carrier detection compared with preamble mode. For this the control circuit size or the circuit size of the correlator for prolonging such period have to be increased.

In case the threshold value is set to a smaller value, the carrier cannot be detected accurately because of adverse effect of noise.

SUMMARY OF THE INVENTION

The objective of the present invention is to solve the above-mentioned tasks.

Moreover, the objective of the present invention is to provide a carrier detection unit and carrier detection method allowing for carrier detection at data mode without prolonging the synchronization integration period or setting the threshold value to a smaller value.

In order to realize the above objectives, the carrier detection unit of the present invention comprises a maximum value detection section for detecting and holding a maximum value of a correlation value of a received spectrum spread signal by each symbol; adder means for sequentially adding the held maximum value by each symbol; and carrier detection means for detecting presence or absence of carrier by comparing the added value with a predetermined threshold value.

The above constructed carrier detection unit allows a maximum value of the correlation value to be added by each symbol. Therefore the presence or absence of carrier can be detected by comparing the added value with the threshold value.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
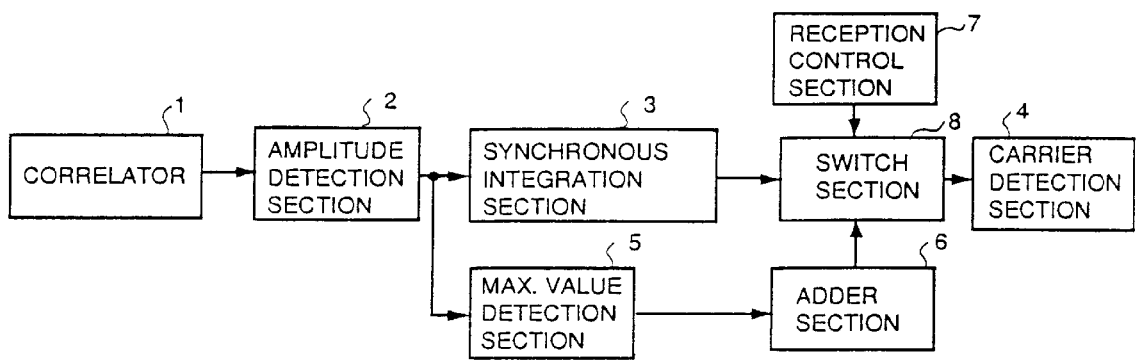
FIG. 1 is a block diagram of an embodiment of the present invention.
Figure 4:
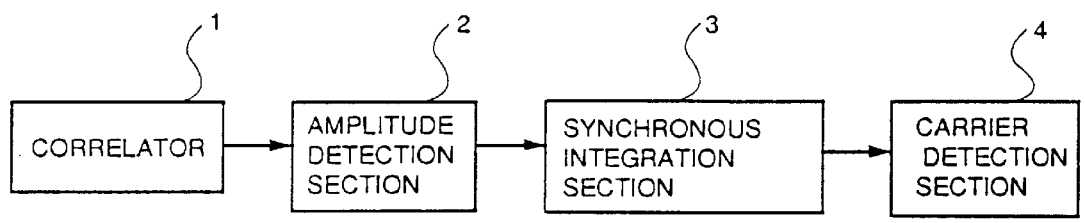
FIG. 4 is a block diagram of a conventional carrier detection unit.
Figure 5:
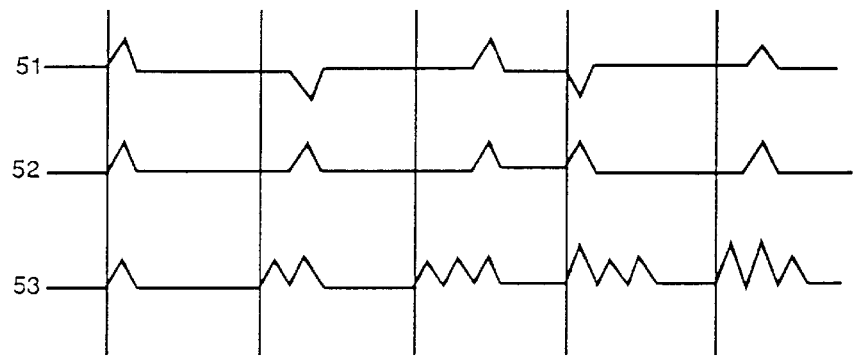
FIG. 5 is a wave chart showing the reception level change at data mode of FIG. 4.

The present invention is described in detail referring to the drawings. FIG. 1 is a block diagram of an embodiment of the present invention. The parts designated as the same numbers as those shown in FIG. 4 are identical to parts thereof. A reference numeral 5 is a maximum value detection section comprising latch means for latching a maximum value in 1 symbol of a correlation value supplied from an amplitude detection section 2 at data mode and holding means for holding the maximum value. A reference numeral 6 is an adder section for adding the maximum value supplied from the maximum value detection section 5 by each symbol; 7 is a reception control section for outputting a control signal depending on the communication mode (preamble mode/data mode); and 8 is a switch section for switching the communication mode to preamble mode by supplying an output of the synchronous integration section 3 to a carrier detection section 4 and switching to data mode by supplying an output of the adder section 6 to the carrier detection section 4 based on the control signal supplied from the reception control section 7.

Figure 3:
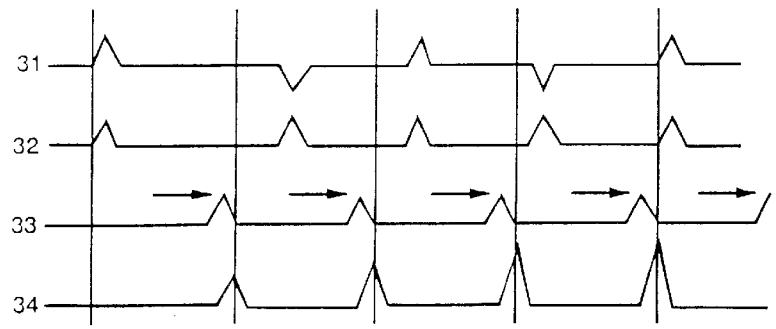
FIG. 3 is a wave chart showing the reception level change at data mode of FIG. 1.

The operation of the above constructed present invention is described in detail referring to the drawings. FIG. 3 is a wave chart showing the reception signal level change at data mode. In FIG. 3, 31 is a wave showing the auto correlation amplitude output from the correlator 1; 32 is a wave showing the absolute value of the wave 31 output from the amplitude detection section 2; 33 is a wave showing the wave 32 at an output timing aligned by the maximum value detection section 5; and 34 is a wave showing an added value of the wave 32 output from the adder section 6.

[Preamble mode]

Based on the control signal output from the reception control section 7, the switch section 8 connects the synchronous integration section 3 with the carrier detection section 4.

Figure 2:
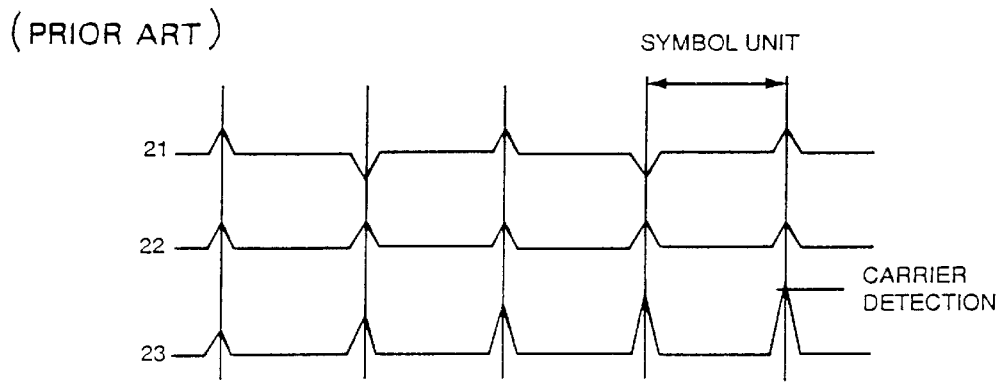
FIG. 2 is a wave chart each showing the reception level change at preamble mode of FIGS. 1 and 4.

The subsequent procedure at preamble mode is the same as that of the conventional art. The resultant wave at the reception level is shown in FIG. 2.

[Data mode]

Based on the control signal output from the reception control section 7, the switch section 8 disconnects the synchronous integration section 3 and the carrier detection section 4 and then connects the adder section 6 with the carrier section 4.

The received spectrum spread signal is inverse spread in the correlator 1 for obtaining an auto correlation (wave 31). Then the amplitude detection section 2 obtains an absolute value of the auto correlation amplitude (wave 32).

The latch means of the maximum value detection section 5 latches a correlation value output from the amplitude detection section 2 at every inverse spread of a spread code. The latched correlation value is compared with the correlation value stored in the holding means. The larger correlation value is updated and held in the holding means.

The above procedure is repeatedly executed with respect to all variations of the spread code. When inverse spread of all spread codes is finished, the correlation value stored in the holding means is supplied to the adder section 6. This correlation value is the maximum value in 1 symbol (wave 33).

The adder section 6 adds up the correlation value supplied by each symbol and outputs the added value (wave 34). This added value is supplied to the carrier detection section 4 via the switch section 8. When the added value reaches a predetermined threshold value within a synchronization integration period, it is judged as "presence of carrier". When the added value is less than the threshold value, it is judged as "absence of carrier". The synchronization integration period and the threshold value can be set to any values.

As aforementioned, the present invention is constructed to latch the maximum value of the correlation value of the received data by each of 1 symbol and to add the maximum value per symbol. Therefore carrier detection can be done without prolonging the synchronization integration period. The present invention, thus, eliminates the need to prepare a new control circuit for prolonging such period nor enlarging the circuit size of the correlator.

Since the threshold value does not have to be set to a smaller value, the present invention is not adversely influenced by noise, resulting in highly accurate carrier detection.

The entire disclosure of Japanese Patent Application No. 8-16585 filed on Feb. 1, 1996 including specification, claims drawing and summary are incorporated herein by reference in its entirety.

What is claimed is:

1. A carrier detection unit of a spread spectrum system comprising:

a correlation means for detecting auto correlation values for a plurality of symbols of a received spectrum spread signal;

an amplitude detection means for detecting an absolute value of each of the auto correlation values detected by said correlation means;

a maximum value detection means for detecting, for each symbol, a maximum value among said absolute values detected by said amplitude detection means and for holding said detected maximum value;

an adder means for adding said held maximum value sequentially for each symbol;

a synchronization integration means having an integration period for integrating said absolute value detected by said amplitude detection means for each symbol;

a control means for outputting a control signal that distinguishes preamble mode and data mode;

a switch means for switching a mode of operation to preamble mode by outputting an output of said synchronization integration means and switching to data mode by outputting an output of said adder means based on said control signal; and carrier detection means for detecting presence/absence of carrier by comparing an output of said switch means with a predetermined threshold value.

2. The carrier detection unit of claim 1 further wherein a predetermined one kind of spread code is used at preamble mode.

3. A carrier detection unit of a spread spectrum system comprising:

a correlation means for detecting auto correlation amplitudes of symbols of a received spectrum spread signal;

an amplitude detection means for detecting, for each symbol, an absolute value of said auto correlation amplitudes detected by said correlation means;

a synchronization integration means for integrating said absolute value detected by said amplitude detection means for each symbol;

a maximum value detection means for detecting a maximum value of said absolute value detected by said amplitude detection means for each symbol and for holding said detected maximum value;

an adder means for adding said held maximum value sequentially for each symbol;

a carrier detection means for detecting presence/absence of carrier by comparing an output of said adder means with a predetermined threshold during a data mode or by comparing an output of said synchronization integration means with said predetermined threshold value during a preamble mode;

reception control means for outputting a control signal that distinguishes said preamble mode and said data mode; and switch means for supplying an output of said synchronization integration means to said carrier detection means at preamble mode and supplying an output of said adder means to said carrier detection means at data mode based on said control signal.

4. The carrier detection unit of claim 3, wherein a predetermined one kind of spread code is used at preamble mode.

5. A carrier detection unit used in a radio data communication system of a spread spectrum system said radio communication system comprising a transmission side where an information signal containing 1 bit serial data is converted into n bit parallel data; an m bit string of said n bit parallel data is information modulated; a spread code having a predetermined code length corresponding to a bit pattern of a respective (n−m) bit string that has not been information modulated is generated; a spectrum spread signal is generated by spread modulating said m bit string with said spread code; and said spectrum spread signal is transmitted; and a reception side where said spectrum spread signal is received, a correlation value is obtained by de-spreading said spectrum spread signal using all kinds of spread codes that have been used for spreading; a spread code generating a maximum value of said correlation value is detected; a first reception bit pattern of (n–m) bit string corresponding to said spread code generating said maximum correlation value is defined, a second reception bit pattern of m bit string is obtained by information demodulating said maximum correlation value; and n bit parallel data are reproduced using the first reception bit pattern of said (n–m) bit string and the second reception bit pattern of said m bit string; said received spectrum spread signal containing symbols; said carrier detection unit comprising:

correlation means for detecting auto correlation amplitudes of said symbols of said received spectrum spread signal;

an amplitude detection means for detecting absolute values of said auto correlation amplitudes detected by said correlation means;

a maximum value detection means for detecting a maximum value of said absolute values for each symbol and for holding said detected maximum value;

an adder means for adding said held maximum value sequentially for each symbol;

a synchronization integration means having an integration period for integrating said absolute values detected by said amplitude detection means for each symbol;

a reception control means for outputting a control signal that distinguishes preamble mode and data mode; and a switch means for outputting an output of said synchronization integration means at preamble mode and for outputting an output of said adder means at data mode based on said control signal; and carrier detection means for detecting presence/absence of carrier by comparing said output of said switch means with a predetermined threshold value.

6. The carrier detection unit of claim 5,
wherein a predetermined one kind of spread code is used at preamble mode.

7. A carrier detection method of a spread spectrum system comprising the steps of:

receiving a spectrum spread signal containing symbols;

detecting an auto correlation amplitude of the received spectrum spread signal for each symbol;

detecting an absolute value of said detected auto correlation amplitude for each symbol;

distinguishing a communication mode between a preamble mode and a data mode;

detecting a maximum value of said detected absolute value for each symbol when said communication mode is said data mode;

adding said detected maximum value sequentially for each symbol when said communication mode is said data mode to provide an added result;

detecting presence/absence of carrier by comparing said added result with a predetermined threshold value when said communication mode is said data mode;

integrating said detected absolute value for each symbol to provide an integrated result and detecting presence/absence of carrier by comparing said integrated result with said predetermined threshold value when communication mode is said preamble mode;

switching between said preamble mode and said data mode based on a control signal, said method further comprising when switching to preamble mode, using said integrated result to detect presence/absence of carrier and when switching to data mode, using said added result to detect presence/absence of carrier.

8. The carrier detection method of claim 7, wherein a predetermined one kind of spread code is used at preamble mode.

9. The carrier detection method of claim 7, wherein said spread spectrum system comprising steps of:

converting an information signal containing 1 bit serial data into n bit parallel data;

information modulating m bit string of said n bit parallel data and generating a spread code having a predetermined code length corresponding to a bit pattern of each of (n–m) bit string that has not been information modulated;

generating said spectrum spread signal by spread modulating said m bit string with said spread code and transmitting said spectrum spread signal;

receiving said spectrum spread signal and obtaining a correlation value by inverse spreading said spectrum spread signal using all kinds of spread codes that have been used for spreading;

detecting a spread code that makes said correlation value maximum and defining a bit pattern of (n–m) bit string corresponding to said spread code generating said maximum correlation value so that a bit pattern of m bit string is obtained by information demodulating said maximum correlation value; and reproducing n bit parallel data based on said bit pattern of said (n–m) bit string and said bit pattern of said m bit string.

* * * * *